United States Patent [19]

Bisping et al.

[11] Patent Number: 4,840,524
[45] Date of Patent: Jun. 20, 1989

[54] ANCHOR MEMBER WITH ELECTRICAL INSULATION JACKET

[75] Inventors: Heinz Bisping; Erich Leibhard, both of Munich; Peter Mauthe, Kelinberghofen, all of Fed. Rep. of Germany

[73] Assignee: Hilti Aktiengesellschaft

[21] Appl. No.: 195,209

[22] Filed: May 18, 1988

[30] Foreign Application Priority Data

May 19, 1987 [DE] Fed. Rep. of Germany ....... 3716703

[51] Int. Cl.$^4$ ...................... F16B 39/02; E21D 20/02
[52] U.S. Cl. .................................. 411/82; 411/180; 411/258; 52/704; 405/261; 174/138 D
[58] Field of Search .................. 411/69, 107, 82, 258, 411/903, 180, 431, 908; 405/259–261; 52/698, 704; 174/138 D

[56] References Cited

U.S. PATENT DOCUMENTS 3,042,744  7/1962  Shoor ........................... 174/138 D
3,514,917  6/1970  Merrill, Sr. ........................ 52/704
4,149,350  4/1979  Fischer et al. ..................... 52/704
4,263,832  4/1981  Lang et al. ........................ 411/82

FOREIGN PATENT DOCUMENTS 2484527  12/1981  France ............................ 405/260

Primary Examiner—Neill R. Wilson
Attorney, Agent, or Firm—Toren, McGeady & Associates

[57] ABSTRACT

An anchor member is formed of an axially extending core member enclosed from one end toward the other by an electrically non-conductive plastics material jacket. The anchor member can be secured in a borehole in a receiving material by a hardenable mass. The jacket at the one or leading end of the core member has a tip located on an extension of the core member axis, so that the tip abuts the center of the base of the borehole. With the centering action afforded by the tip, damage to the jacket is prevented as the anchor member is inserted into the borehole.

13 Claims, 1 Drawing Sheet

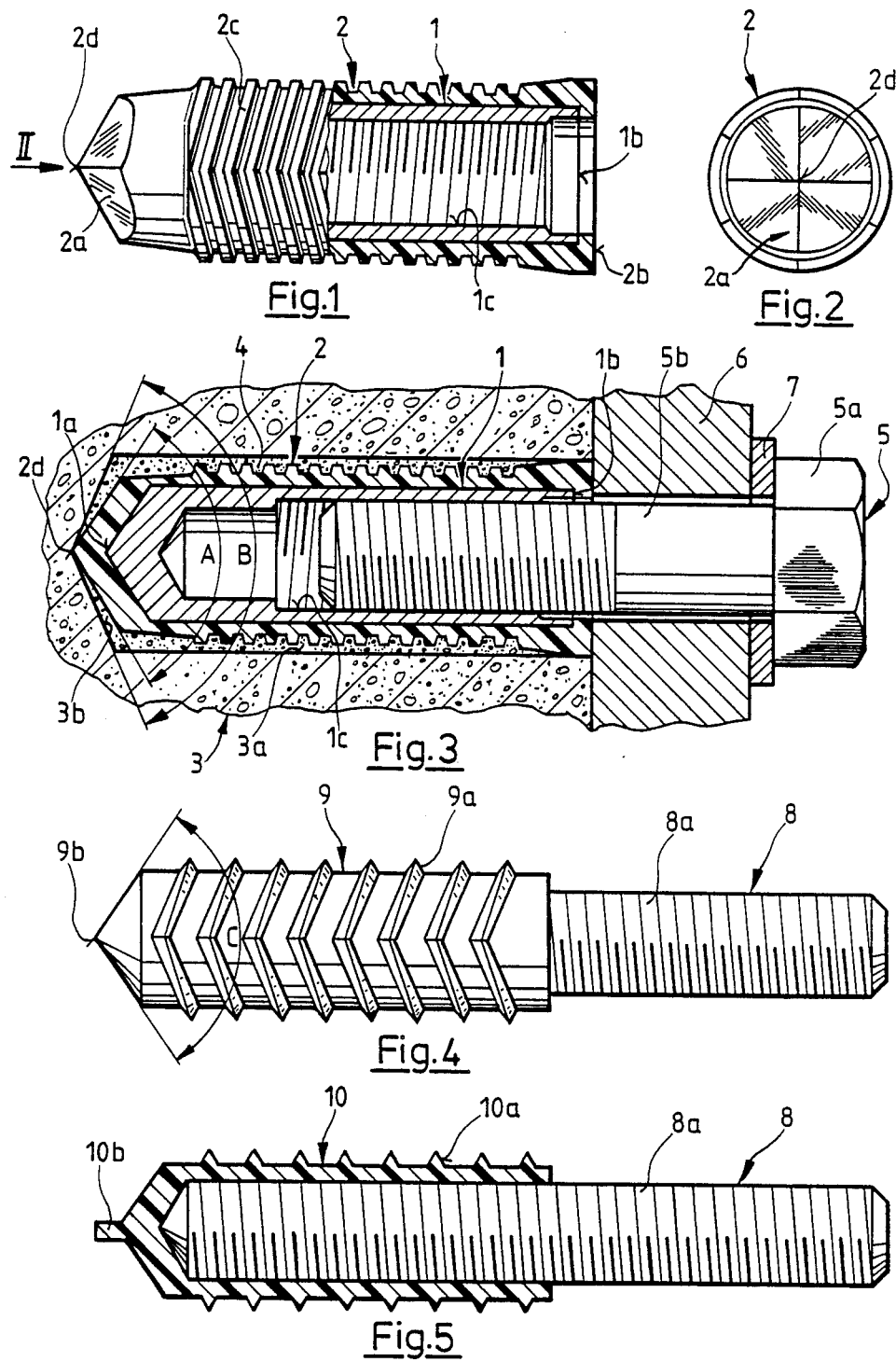

ANCHOR MEMBER WITH ELECTRICAL INSULATION JACKET

BACKGROUND OF THE INVENTION

The present invention is directed to an anchor member securable within a borehole in a receiving material by a settable or hardenable mass. The anchor member includes an axially extending core member formed of metal with an axially extending connecting thread thereon. The portion of the core member inserted into the receiving material is enclosed in a jacket of a electrically non-conductive plastics material.

Anchor members of the type described above are used mainly in railroad construction for securing rails, carrying an electrical current, to a substructure formed of concrete. Initially, a settable hardenable mass in a premixed state or in separate compartments of a destructable cartridge is injected into a borehole and subsequently the anchor member is placed into the borehole. During the insertion of the anchor member, usually with a rotational motion, a mixing of the hardenable mass components as well as a uniform distribution of the mass takes place within the borehole. The attachment member is inserted into the borehole until its leading end in the installation direction reaches the base of the borehole.

In known anchor members of this type, for example as disclosed in DE-OS No. 33 20 429, the leading end of the jacket is shaped in the manner of a wedge-like or roof-like cutter extending transversely of the core member axis. With this type of leading end of the jacket, initially the anchor member contacts the base of the borehole at its radially outermost points. The jacket can be damaged or destroyed at its leading end, particularly when the anchor member is being installed with a turning or rotational action, so that the insulating effect of the jacket around the core member may not be complete.

SUMMARY OF THE INVENTION

Therefore, the primary object of the present invention is to provide an anchor member securable by a hardenable mass and laterally enclosed at least in part in an electrical insulating jacket so that the jacket is not destroyed during the installation of the anchor member.

In accordance with the present invention, the jacket is formed at the leading end of the anchor member with a stop arranged to abut against the receiving material at the center of the base of the borehole.

With a centered stop located at the leading end of the anchor member, where the cross-sectional area of the stop represents only a small fraction of the surface of the leading end of the anchor member, it assures that the anchor member is centered in the borehole base and does not contact the circumferential surface of the borehole. The relative motion or contact between the jacket on the anchor member and the borehole surface is small. Accordingly, damage to the jacket is prevented at the leading end of the anchor member as it contacts the base of the borehole.

Preferably, the stop is formed by a tip at the leading end of the jacket having a conically-shaped contour. The tip can be in the form of a circular cone or shaped as a four-sided pyramid. To obtain a uniform wall thickness of the jacket, it is preferable that the leading end of the core member also has a conically shape.

It is advantageous if the cone angle of the tip of the jacket is smaller than the cone angle of the base of the borehole. With this angular relationship, it is assured that the tip of the jacket is located at the center of the borehole. This angular difference between the jacket tip and the borehole base can be small. As a result, the amount of the hardenable mass at the leading end of the anchor member is small. If a pyramidally-shaped tip is used, it must be assured that the angle between opposite sides of the surfaces forming the pyramidally-shaped tip is smaller than the corresponding angle of the surfaces forming the borehole base.

In still another desirable embodiment, the stop is in the form of a lug-like projection. Such a lug-like projection can be molded as a part of the jacket or it can be attached to it subsequently. The lug-like projection can be attached to the jacket by a rated breaking point, so that the projection is broken off from the jacket as soon as it contacts the base of the borehole.

The core member can be in the form of an axially extending anchor stud with an external thread section projecting outwardly from the jacket opposite to the installation direction. Threaded rods can be used for the anchor stud and can be cut to the desired length as required, whereby an economical fabrication of the anchor members is obtained. The thread on the anchor stud affords an effective positive locking engagement between the stud and the jacket.

In accordance with the present invention, it is also possible to form the core member as a threaded sleeve with an internal thread so that the internal thread serves to receive an anchor stud. Such an anchor member has the advantage that, after the anchor stud is screwed out of the sleeve, the remainder of the anchor member does not project out of the receiving material. To prevent any damage to the thread in the sleeve during construction work, a detachable plug can be used to protect the internal thread.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 1 is an axially extending view of an anchor member embodying the present invention and shown partly in section;

FIG. 2 is a leading end view of the anchor member shown in FIG. 1, viewed in the direction of the arrow II in FIG. 1;

FIG. 3 is an axially extending sectional view of the anchor member displayed in FIGS. 1 and 2, secured within a receiving material;

FIG. 4 is an axially extending view of another anchor member embodying the present invention; and FIG. 5 is an axially extending view, partly in section, of still another embodiment of an anchor member incorporating the present invention.

DETAILED DESCRIPTION OF THE INVENTION

In FIGS. 1 and 3, an anchor member is shown made up of a core member 1 in the form of a threaded sleeve and a jacket 2 of an electrically non-conducting plastics material enclosing the core member from its leading end, the left-hand end in FIGS. 1 and 3, towards its trailing end. The core member or threaded sleeve 1 has a closed leading end 1a and an open trailing end 1b. An internal thread 1c extends from adjacent the trailing end 1b toward the leading end 1a of the threaded sleeve. Note in FIG. 3 that the internal thread 1c stops at an axial distance spaced from the base of the blind bore in the sleeve. The jacket 2 has a leading end 2a and a trailing end 2b with the trailing end forming an inwardly directed flange bearing against the trailing end 1b of the threaded sleeve 1. The circumferential outer of the jacket 2 has arrow-shaped ridges or lands 2c. The ridges or lands 2c start at a location spaced axially from the leading end 2a of the jacket and end at a spaced location from the trailing end 2h of the jacket. At its leading end 2a, the jacket has a pyramidally-shaped tip 2d. In FIG. 3, the anchor member made up of the core member or threaded sleeve 1 and the jacket 2 is inserted into an axially extending borehole 3a in a receiving material 3. A hardenable mass 4 is inserted into the borehole 3a prior to the insertion of the anchor member. The hardenable mass 4 secures the anchor member in the receiving material 3. The anchor member is inserted into the borehole 3a of the receiving material 3 until the tip 2d at its leading end contacts the base of the borehole 3b. Cone angle A of the pyramidally-shaped leading end 2a is smaller than the cone angle B of the base of the borehole 3b. As a result, the insertion of the anchor member is completed when it contacts the center of the base 3b of the borehole 3a. The centering action prevents contact of the circumferential region of the jacket 2 with the base 3b of the borehole 3a. Accordingly, damage to or destruction of the jacket 2 is prevented while the anchor member is driven into the borehole and is rotated about its axis.

After the hardenable mass 4 has set, a axially elongated bolt 5 is threaded into the internal thread 1c of the threaded sleeve 1, passing through an opening formed in a structural member 6 to be attached to the surface of the receiving material 3. Bolt 5 has a hexagonal head 5a at its trailing end and a shank 5b threaded for a portion of its axial length from the leading end of the bolt. A washer 7 is located between the head 5a of the bolt 5 and the member 6 to be attached to the receiving material. By tightening the bolt 5, the structural member 6 can be pressed against the surface of the receiving material 3. The arrow-shaped ridges 2c on the circumferential surface of the jacket 2 provide a positive lock with the hardenable mass. Initially, an adhesive connection is provided between the hardenable mass 4 and the surface of the borehole 3a in the receiving material 3.

Another anchor member is displayed in FIG. 4 made up of an axially elongated anchor stud 8b with an axially extending external thread 8a, and a jacket 9 enclosing an axially extending section of the anchor stud from its leading end toward its trailing end. Jacket 9 has spaced arrow-shaped ridges or projections 9a, extending around its circumferential surface. The ridges 9a afford a positive lock with a hardenable mass which secures the anchor member within a borehole, such as shown in FIG. 3. At its leading end, the jacket 9 has a conically-shaped tip 9b. The cone angle of the tip 9b is smaller than the usual cone angle of the base of the borehole in the receiving material into which the anchor member is inserted.

Another anchor member embodying the present invention is illustrated in FIG. 5 and is made up of an anchor stud 8 and a jacket 10 formed of an electrically non-conductive plastics material with the jacket enclosing an axially extending section of the stud from its leading end toward its trailing end. Jacket 10 has ridges 10a extending around its circumference and a lug-like projection 10b at its leading end. Projection 10b serves as an axial stop when the anchor member is inserted into a borehole. The projection 10b can be formed so that it breaks off if the attachment member is driven with excessive force into a borehole without the jacket 10 being damaged or destroyed.

The jackets 9 and 10 in FIGS. 4 and 5 are inserted into a borehole in receiving material in the same manner as the jacket 2 in FIG. 3, so that the anchor member or stud is spaced from the receiving material by the jacket.

While specific embodiments of the invention have been shown and described in detail to illustrate the application of the inventive principles, it will be understood that the invention may be embodied otherwise without departing from such principles.

We claim:

1. Anchor member securable in a hardenable mass in an axially extending borehole in a receiving material, comprising an axially extending metal core member having a leading end in the direction said anchor member is inserted into the borehole and a trailing end, said core member having an axially extending connecting thread, a jacket enclosing said core member in the axial direction thereof from the leading end at least for an axially extending section toward the trailing end, said jacket is formed of an electrically non-conductive plastics material at least in an axially extending section of said jacket to be located within the receiving material, wherein the improvement comprises a stop centered at the leading end of said jacket on an extension of the axis of said core member and said stop arranged to abut at the base of the borehole approximately along the axis of the borehole, said stop is a conically-shaped tip on the leading end of said jacket with the apex of said tip located approximately on the projection of the axis of said core member.

2. Anchor member, as set forth in claim 1, wherein said tip of said jacket has a cone angle arranged to be smaller than a corresponding cone angle of the borehole base.

3. Anchor member, as set forth in claim 1, wherein said jacket is formed of a plastics material.

4. Anchor member, as set forth in claim 1, wherein said core member is an axially elongated anchor stud with the trailing end thereof projecting outwardly from said jacket, said connecting thread comprises an axially extending external thread on said stud extending from said jacket toward the trailing end of said stud.

5. Anchor member securable in a hardenable mass in an axially extending borehole in a receiving material, comprising an axially extending metal core member having a leading end in the direction said anchor member is inserted into the borehole and a trailing end, said core member having an axially extending connecting thread, a jacket enclosing said core member in the axial direction thereof from the leading end at least for an axially extending section toward the trailing end, said jacket is formed of an electrically non-conductive plastics material at least in an axially extending section of said jacket to be located within the receiving material, wherein the improvement comprises a stop centerd at the leading end of said jacket on an extension of the axis of said core member and said stop arranged to abut at the base of the borehole approximately along the axis of the borehole, said stop is in the form of a lug-like projection extending from the leading end of said jacket and located along the projection of the axis of said core member.

6. Anchor member, as set forth in claim 5, wherein said jacket is formed of a plastics material.

7. Anchor member securable in a hardenable mass in an axially extending borehole in a receiving material, comprising an axially extending metal core member having a leading end in the direction said anchor member is inserted into the borehole and a trailing end, said core member having an axially extending connecting thread, a jacket enclosing said core member in the axial direction thereof from the leading end at least for an axially extending section toward the trailing end, said jacket is formed of an electrically non-conductive plastics material at least in an axially extending section of said jacket to be located within the receiving material, wherein the improvement comprises a stop centered at the leading end of said jacket on an extension of the axis of said core member and said stop arranged to abut at the base of the borehole approximately along the axis of the borehole, said core member is a threaded sleeve with a closed leading end and said connecting thread is an internal thread located within said sleeve.

8. Anchor member, as set forth in claim 7, wherein said jacket is formed of a plastics material.

9. Anchor member, as set forth in claim 7, wherein said sleeve is wholly located within said jacket.

10. Anchor member securable in a hardenable mass in an axially extending borehole in a receiving material, comprising an axially extending metal core member having a leading end in the direction said anchor member is inserted into the borehole and a trailing end, said core member having an axially extending connecting thread, a jacket enclosing said core member in the axial direction thereof from the leading end at least for an axially extending section toward the trailing end, said jacket is formed of an electrically non-conductive plastics material at least in an axially extending section of said jacket to be located within the receiving material, wherein the improvement comprises a stop centered at the leading end of said jacket on an extension of the axis of said core member and said stop arranged to abut at the base of the borehole approximately along the axis of the borehole, said jacket has a plurality of axially spaced circumferentially extending ridge-like ribs on the radially outer surface of said jacket with said ribs having an arrow-head-like configuration directed towards the leading end thereof.

11. Anchor member, as set forth in claim 10, wherein said jacket is formed of a plastics material.

12. Anchor member securable in a hardenable mass in an axially extending borehole in a receiving material, comprising an axially extending metal core member having a leading end in the direction said anchor member is inserted into the borehole and a trailing end, said core member having an axially extending connecting thread, a jacket enclosing said core member in the axial direction thereof from the leading end at least for an axially extending section toward the trailing end, said jacket is formed of an electrically non-conductive plastics material at least in an axially extending section of said jacket to be located within the receiving material, wherein the improvement comprises a stop centered at the leading end of said jacket on an extension of the axis of said core member and said stop arranged to abut at the base of the borehole approximately along the axis of the borehole, the leading end of said jacket has a pyramidally-shaped surface with the apex of said pyramidally-shaped surface located approximately on the projection of the axis of said core member.

13. Anchor member, as set forth in claim 12, wherein said jacket is formed of a plastics material.

* * * * *